United States Patent
Horii

(10) Patent No.: US 12,523,011 B2
(45) Date of Patent: Jan. 13, 2026

(54) SWIVEL WORKING MACHINE

(71) Applicant: KUBOTA CORPORATION, Osaka (JP)

(72) Inventor: Hiroshi Horii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 528 days.

(21) Appl. No.: 17/554,443

(22) Filed: Dec. 17, 2021

(65) Prior Publication Data

US 2022/0235534 A1 Jul. 28, 2022

(30) Foreign Application Priority Data

Jan. 27, 2021 (JP) ................... 2021-011436

(51) Int. Cl.
| | |
|---|---|
| *E02F 9/20* | (2006.01) |
| *E02F 3/32* | (2006.01) |
| *E02F 3/43* | (2006.01) |
| *E02F 9/12* | (2006.01) |
| *E02F 9/22* | (2006.01) |

(Continued)

(52) U.S. Cl.
CPC ............ *E02F 9/2012* (2013.01); *E02F 3/325* (2013.01); *E02F 3/435* (2013.01); *E02F 9/123* (2013.01);

(Continued)

(58) Field of Classification Search
CPC ......... E02F 9/2012; E02F 3/325; E02F 3/435; E02F 9/123; E02F 9/2225; E02F 9/2285;

(Continued)

(56) References Cited

U.S. PATENT DOCUMENTS

| | | |
|---|---|---|
| 6,502,896 B1 | 1/2003 | Nakata et al. |
| 2002/0116921 A1 | 8/2002 | Shimokakiuchi et al. |

(Continued)

FOREIGN PATENT DOCUMENTS

| | | | |
|---|---|---|---|
| CA | 2689325 A1 * | 12/2008 | ............ E02F 3/432 |
| EP | 2 031 136 A2 | 3/2009 | |

(Continued)

OTHER PUBLICATIONS

Indian Office Action for Indian Application No. 202114058892, dated Aug. 3, 2022, with English translation.

(Continued)

*Primary Examiner* — Nga X Nguyen
(74) *Attorney, Agent, or Firm* — BIRCH, STEWART, KOLASCH & BIRCH, LLP

(57) ABSTRACT

A swivel working machine includes a machine body swivelable around a swivel axis, a working device attached to the machine body swingably around a swing axis, an operation member to be handled and operated by an operator, and a controller to control swivel movement, which is a swiveling movement of the machine body, and swing movement, which is a swinging movement of the working device. The controller includes an operation pattern shifting unit configured or programmed to perform shifting between a swivel operation state where operation of the operation member in a specific direction causes the swivel movement and a swing operation state where the operation of the operation member in the specific direction causes the swing movement.

7 Claims, 11 Drawing Sheets

(52) U.S. Cl.
CPC ............ *E02F 9/2225* (2013.01); *E02F 9/2285* (2013.01); *E02F 9/2292* (2013.01)

(58) Field of Classification Search
CPC ........ E02F 9/2292; E02F 9/2296; G05D 1/43; G05D 1/435; G05D 2105/00; G05D 2105/05
See application file for complete search history.

(56) References Cited

U.S. PATENT DOCUMENTS

| | | | | |
|---|---|---|---|---|
| 2009/0056964 | A1* | 3/2009 | Kunizawa | E02F 3/7613 172/823 |
| 2019/0359257 | A1* | 11/2019 | Johnson | B62D 55/06 |
| 2022/0010522 | A1* | 1/2022 | Shiratani | E02F 9/2242 |
| 2022/0042282 | A1* | 2/2022 | Nakayama | F16P 3/16 |

FOREIGN PATENT DOCUMENTS

| | | | | |
|---|---|---|---|---|
| JP | 2002-250053 | A | | 9/2002 |
| JP | 3466952 | B2 | | 11/2003 |
| JP | 2007092763 | A * | 4/2007 | ............ E02F 9/2079 |
| JP | 3980912 | B2 | | 9/2007 |
| JP | 2009-52285 | A | | 3/2009 |
| JP | 2019011792 | A * | 1/2019 | ............ E02F 9/2296 |

OTHER PUBLICATIONS

Japanese Office Action for Japanese Application No. 2021-011436, dated Feb. 20, 2024, with English translation.

* cited by examiner

Fig. 9

First configuration

| | Slide switch | SW1 | SW2 | Trigger switch | | Swing | Pedal installed (JS) |
|---|---|---|---|---|---|---|---|
| Right handle | AUX1 | Horn | Activate AUX | Lock AUX | | 4P_SW | None |
| Left handle | AUX2 | Release dumping | Blank | | | | |

Second configuration

| | Slide switch | SW1 | SW2 | Trigger switch | | Swing | Pedal not-installed |
|---|---|---|---|---|---|---|---|
| Right handle | AUX1 | Horn | Activate AUX | Lock AUX | | 4P_SW | None |
| Left handle | AUX2/Swing | Release dumping | Blank | AUX2/Swing switching | | | |

Third configuration

| | Slide switch | SW1 | SW2 | Trigger switch | | Swing | Pedal not-installed |
|---|---|---|---|---|---|---|---|
| Right handle | thumb(=AUX2) | Horn | Activate AUX | Lock AUX | AUX1/Swing switching | 4P_SW | Installed |
| Left handle | AUX1/Swing | Release dumping | Blank | | AUX1/Swivel switching | | |
| | AUX1/Swivel | | | | | | |

SWIVEL WORKING MACHINE

CROSS REFERENCE TO RELATED APPLICATIONS

This application claims the benefit of priority to Japanese Patent Application No. 2021-011436 filed on Jan. 27, 2021. The entire contents of this application are hereby incorporated herein by reference.

BACKGROUND OF THE INVENTION

1. Field of the Invention

The present invention relates to a swivel working machine including a backhoe or so on.

2. Description of the Related Art

A swivel working machine disclosed in Japanese Unexamined Patent Publication No. 2009-52285 is known.

The swivel working machine disclosed in Japanese Unexamined Patent Publication No. 2009-52285 includes a machine body that can swivel around a swivel axis, and a working device attached to the machine body swingably around the swing axis. A swivel movement in which the machine body swivels is performed by an operation of an operation member that is handled and operated by an operator. A swing movement in which the working device is swung is performed by a swing pedal to be operated by a foot of an operator.

SUMMARY OF THE INVENTION

There is a working machine called a TLB (Tractor Loader Backhoe) in which a front loader is attached to a front portion of the tractor and a backhoe is attached to a rear portion of the tractor. In this TLB, the working device mounted on the backhoe generally can be swung by an operation member handled and operated by an operator. In a case where an operator who is accustomed to riding this TLB uses the swivel working machine, the operator desires to swing the working device through an operation of the operation member handled and operated by the operator.

In view of the problems, a swivel working machine is configured to swing a working machine by means of an operation member handled and operated by an operator.

In an aspect, a swivel working machine includes a machine body swivelable around a swivel axis, a working device attached to the machine body swingably around a swing axis, an operation member to be handled and operated by an operator, and a controller to control swivel movement, which is a swiveling movement of the machine body, and swing movement, which is a swinging movement of the working device. The controller includes an operation pattern shifting unit configured or programmed to perform shifting between a swivel operation state where operation of the operation member in a specific direction causes the swivel movement and a swing operation state where the operation of the operation member in the specific direction causes the swing movement.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 9 is a view showing configurations of the swivel working machine.

DETAILED DESCRIPTION OF THE PREFERRED EMBODIMENTS

Figure 1:
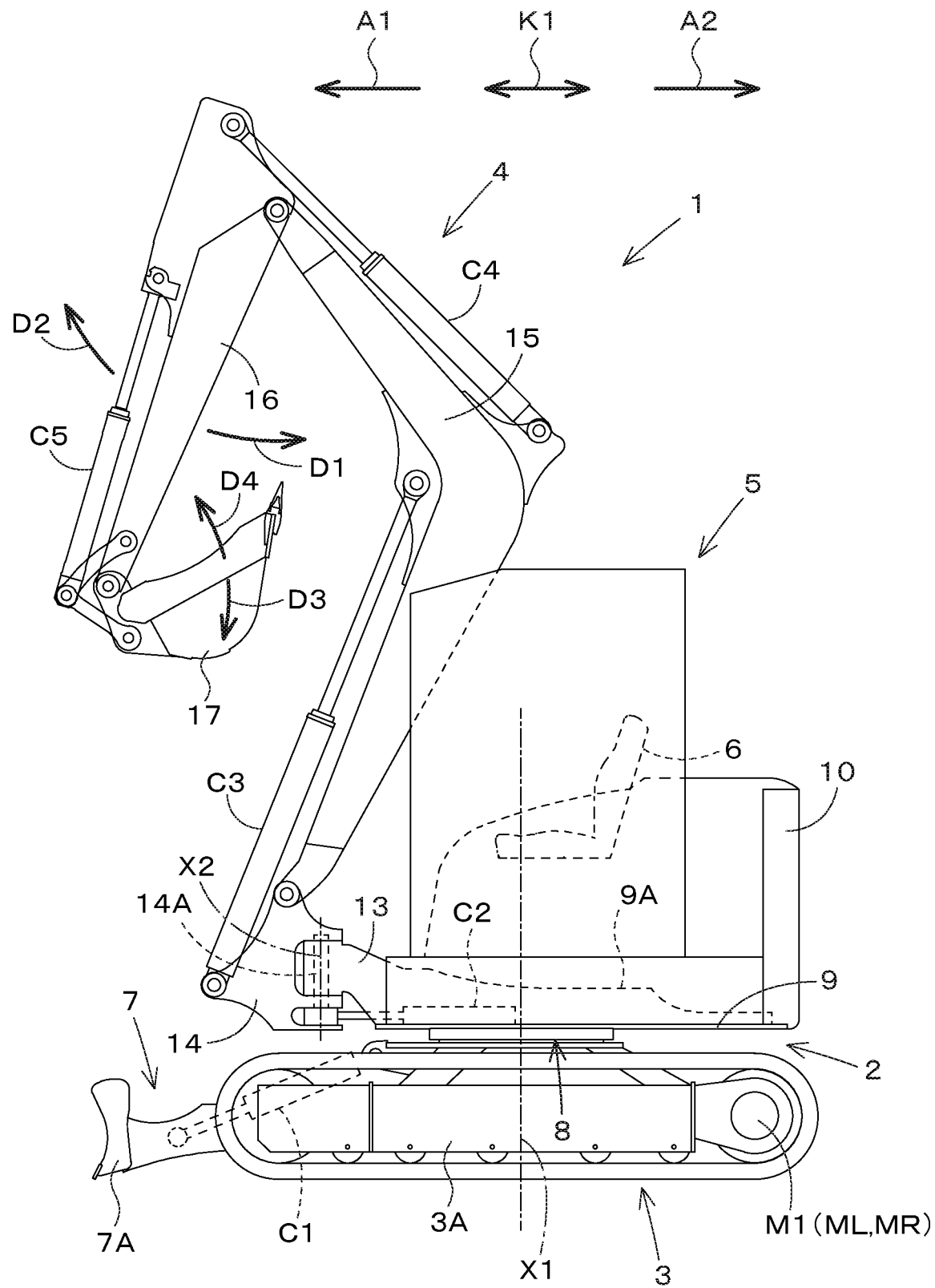
FIG. 1 is a side view of a swivel working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, an embodiment of the invention will be described below.

Figure 2:
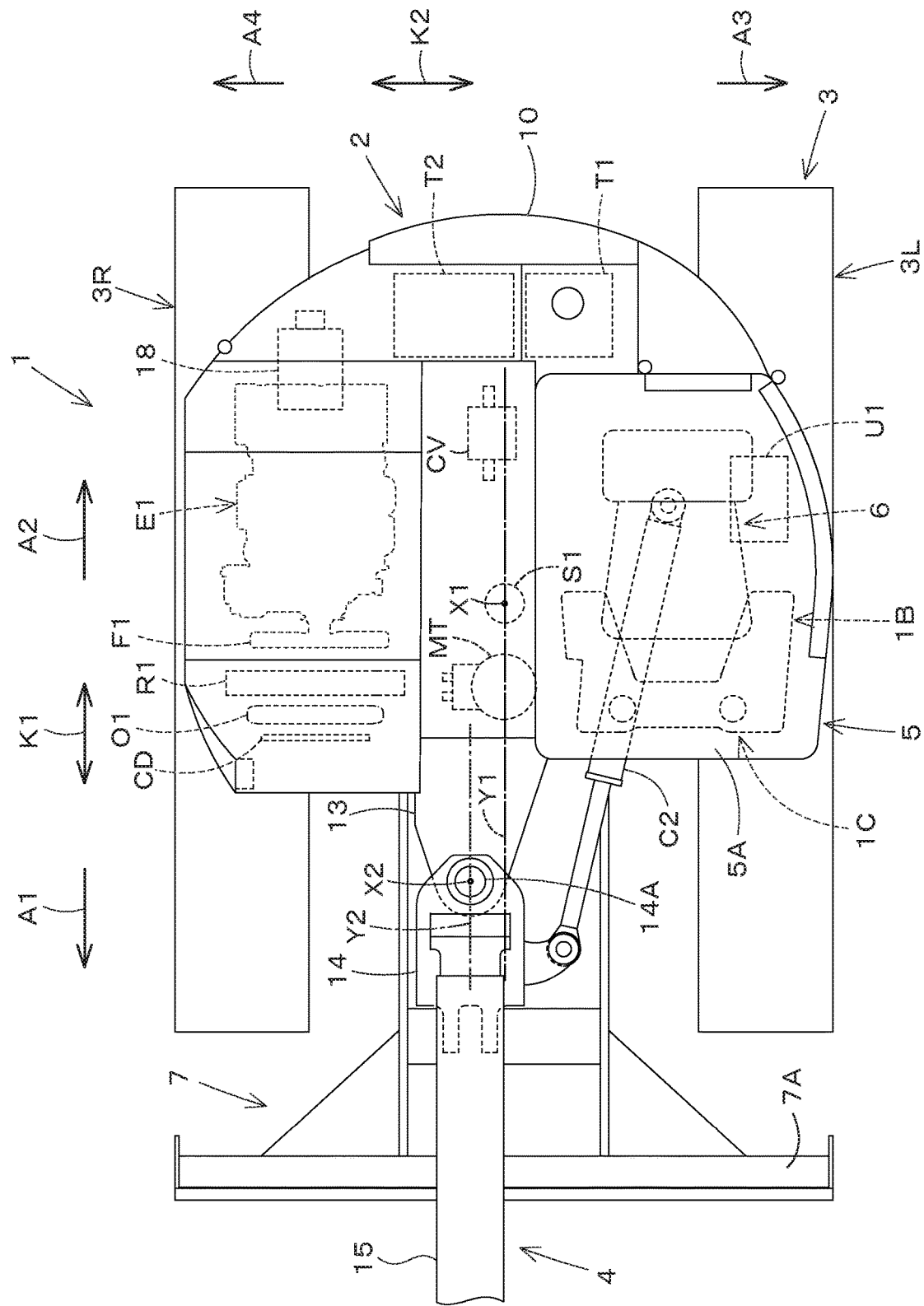
FIG. 2 is a plan view of the swivel working machine.

FIG. 1 is a schematic side view showing an overall configuration of a swivel working machine 1. FIG. 2 is a schematic plan view of the swivel working machine 1. In the embodiment, a backhoe is illustrated as the swivel working machine 1.

As shown in FIGS. 1 and 2, the swivel working machine 1 includes a machine body (swivel base) 2, a traveling device 3, and a working device 4. A cabin 5 is mounted on the machine body 2. In an interior of the cabin 5, a driver's seat 6 on which an operator (driver) sits.

In the embodiment, a forward direction of the operator sitting on the operator's seat 6 of the swivel working machine 1 (a direction of an arrowed line A1 in FIGS. 1 and 2) is referred to as the front (forward of the machine body), and a backward direction of the operator (a direction of an arrowed line A2 in FIGS. 1 and 2) is referred to as the rear (backward of the machine body), and an arrowed line K1 in FIGS. 1 and 2 is referred to as a fore-and-aft direction. In addition, a leftward direction of the operator (a front surface side of a sheet of FIG. 1, a direction of an arrowed line A3 in FIG. 2) is referred to as the left, and a rightward direction of the operator (a back surface side of the sheet of FIG. 1, a direction of an arrowed line A4 in FIG. 2) is referred to as the right.

A horizontal direction, which is orthogonal to the fore-and-aft direction (fore-and-aft direction in machine body) K1, is referred to as a machine width direction K2 (see FIG. 2). A direction extending rightward or leftward from the machine-width directional center of the machine body 2 is referred to as an outward direction in the machine width. That is, a machine width directional outward direction is one machine width direction K2 separating away from the machine-width directional center of the machine body 2. A direction opposite to the machine-width directional outward direction is referred to as a machine-width directional inward direction. That is, the machine-width directional inward direction is the other machine width direction K2 approaching the machine-width directional center of the machine body 2.

As shown in FIG. 1 and FIG. 2, the traveling device 3 is a device that travelably supports the machine body 2. The traveling device 3 includes a traveling frame 3A, a first traveling device 3L disposed on a left side of the traveling frame 3A, and a second traveling device 3L disposed on a right side of the traveling frame 3A. The first traveling device 3L and the second traveling device 3R are crawler-type traveling devices. The traveling device 3 is driven by traveling motor M1 constituted of hydraulic motors (hydraulic actuators). In detail, the traveling motors M1 include a first traveling motor ML for driving the first traveling device 3L and a second traveling motor MR for driving the second traveling device 3R.

A dozer 7 is attached to a front portion of the traveling device 3. The dozer 7 is driven by a dozer cylinder C1. In detail, the dozer cylinder C1 is constituted of a hydraulic cylinder (hydraulic actuator). The dozer cylinder C1 is extended and contracted to raise and lower a blade 7A of the dozer 7.

As shown in FIG. 1, the machine body 2 is supported on the traveling device 3 (the traveling frame 3A) via a swivel bearing 8 so that to the machine body 2 can swivel around a swivel axis X1. The swivel axis X1 is an axis (vertical axis) extending in a vertical direction through the center of the swivel bearing 8.

As shown in FIG. 2, the cabin 5 is mounted on one side portion (left side portion) of the machine body 2 in the width direction K2. The cabin 5 is located closer to the one side portion (left side portion) in the machine width direction K2 than a center line Y1 extending in the fore-and-aft direction K1 across the swivel axis X1.

As shown in FIG. 2, a prime mover E1 is mounted on the other side portion (right side portion) of the machine body 2 in the width direction K2. The prime mover E1 is mounted longitudinally on the machine body 2. The longitudinally mounting means that a crankshaft of the prime mover E1 is arranged with its axis extending in the fore-and-aft direction K1. The prime mover E1 is a diesel engine. The prime mover E1 may be a gasoline engine, an electric motor, or a hybrid type having an engine and an electric motor.

A pressure fluid supply unit 18 is disposed on a rear portion of the prime mover E1. The pressure fluid supply unit 18 is driven by a power of the prime mover E1 to pressurize and deliver hydraulic fluid used for hydraulic drivers. The hydraulic drivers include, for example, a hydraulic actuator provided in the swivel working machine 1. A radiator R1, an oil cooler O1 and a condenser CD are arranged in front of the prime mover E1, and are mounted on the machine body 2. The radiator R1 is a cooling device configured to cool the cooling water (fluid) for the prime mover E1, and the oil cooler O1 is a cooling device configured to cool the hydraulic fluid (fluid). The oil cooler O1 is a cooling device that cools the hydraulic oil (fluid). In addition, the condenser CD is a cooling device (condenser) configured to cool a refrigerant (fluid) of an air conditioning device (air conditioner) provided in the swivel working machine 1.

A cooling fan F1 for generating a cooling air to cool the prime mover E1 is disposed between the radiator R1 and the prime mover E1. The cooling fan F1 is driven by a power of the prime mover E1 to generate the cooling air flowing from the front to the rear.

As shown in FIG. 1, the machine body 2 includes a base plate (hereinafter referred to as a swivel base) 9 that swivels around the swivel axis X1. The swivel base 9 is formed of a steel plate or the like, and defines a bottom portion of the machine body 2. On an upper surface of the swivel base 9, a longitudinal rib 9A, which is a reinforcing member, is disposed and extended from the front to the rear. The swivel base 9 includes the longitudinal rib 9A and members for supporting components to be mounted on the machine body 2, thereby constituting a swivel frame, which is a framework of the machine body 2. A circumference of the swivel frame in the horizontal direction is covered with a swivel cover.

A weight 10 is disposed on a rear portion of the machine body 2. The weight 10 is located at the rear portion of the machine body 2, and a lower portion of the weight 10 is attached to the swivel base 9.

As shown in FIG. 2, a fuel tank T1 and a hydraulic fluid tank T2, which are arranged side by side in the machine width direction K2, are mounted on the rear portion of the machine body 2. The fuel tank T1 is a tank configured to store fuel for the prime mover E1. The hydraulic fluid tank T2 is a tank configured to store the hydraulic fluid.

As shown in FIG. 2, a swivel motor MT is located at a front portion of the swivel base 9 (machine body 2) and at the center portion of the swivel base 9 in the machine width direction K2. The swivel motor MT swivels the swivel base 9 rotatably around the swivel axis X1. The swivel motor MT is a hydraulic motor (hydraulic actuator). A swivel joint S1 is disposed at a position of the swivel axis X1. The swivel joint S1 is a hydraulic device for supplying the hydraulic fluid, and is a rotary coupler (rotary joint) that supplies the hydraulic fluid between the hydraulic devices on the machine body 2 and the hydraulic devices on the traveling device 3. A control valve CV is located behind the swivel joint S1. The control valve CV is a sectional type combined control valve having a plurality of control valves stacked and coupled in the vertical direction. A controller U1 is disposed below the cabin 5.

A steering device 1B for steering the swivel working machine 1 is provided inside the cabin 5. The steering device 1B is installed in front of the driver's seat 6. A driving unit 1C includes the driver's seat 6 and the steering device 1B.

As shown in FIG. 2, the machine body 2 includes a support bracket 13 disposed at a front portion of the machine body 2 slightly rightward of the center in the machine width direction K2. The support bracket 13 is fixed to a front portion of the longitudinal rib 9A, and protrudes forward from the machine body 2.

As shown in FIGS. 1 and 2, a swing bracket 14 is attached to, via a swing shaft 14A, a front portion of the support bracket 13 (a portion protruding from the machine body 2) so that the swing bracket 14 can swing around the swing axis X2. The swing axis X2 is an axis extending in the vertical direction. Accordingly, the swing bracket 14 is rotatable in the machine width direction K2 (in the horizontal direction around the swing axis 14A).

As shown in FIG. 1, the working device 4 is supported by the swing bracket 14 (machine body 2). Accordingly, the working device 4 is attached to the machine body 2 swingably around the swing axis X2.

The working device 4 includes a boom 15 supported by the machine body 2 swingably in the vertical direction (vertically swingable), an arm 16 pivotally connected to the boom 15 to be swingable, and a working tool (bucket) 17 pivotably connected to the arm 16 to be swingable.

A base portion of the boom 15 is pivotally connected, via a pivotal shaft, to an upper portion of the swing bracket 14. In detail, the base portion of the boom 15 is pivotally attached to an upper portion of the swing bracket 14 swingably around a lateral axis (an axis extending in the machine width direction K2) with the boom 15 is facing the front direction of the machine body. In this manner, the boom 15 is configured to swing in the vertical direction (vertically swingable).

The arm 16 is pivotally supported at a tip portion of the boom 15 via a pivotal shaft. In detail, the arm 16 is pivotably attached to the boom 15 swingably around the lateral axis on an assumption that the boom 15 faces forward of the machine body. In this manner, the arm 16 is configured to swing in the fore-and-aft direction K1 or the vertical direction. In addition, the arm 16 is swingable in an arm clouding direction D1, which is a direction approaching the boom 15, or in an arm dumping direction D2, which is a direction separating from the boom 15.

The working tool 17 is pivotally supported by the tip portion of the arm 16 via a pivotal shaft. In detail, the working tool 17 is pivotably attached to the arm 16 swingably around the lateral axis with the boom 15 facing the front direction of the machine body. In this manner, the working tool 17 is capable of swinging in a bucket clouding direction D4, which is a direction approaching the arm 16, and in a bucket dumping direction D3, which is a direction separating from the arm 16. In addition, the bucket serving as the working tool 17 is disposed on the arm 16 so that the bucket can move in a scooping movement and a dumping movement. The scooping movement is a movement to swing the working tool 17 in the direction to approach the boom 15 (bucket clouding direction D4), that is, a movement to scoop, for example, dirt and sand. In addition, the dumping movement is a movement to swing the working tool 17 in the direction to separate away from the boom 15 (bucket dumping direction D3), that is, a movement to drop (discharge), for example, scooped dirt and sand.

The swivel working machine 1 can be equipped with an alternative working tool that can be driven by a hydraulic actuator (a hydraulic attachment AUX attached to the working device 4 (see FIG. 3)). For example, the alternative working tool may be a thumb, a hydraulic breaker, a hydraulic crusher, an angle broom, an earth auger, a pallet fork, a sweeper, a mower, a snow blower, or the like.

The swing bracket 14 can be swung by extending and contracting a swing cylinder C2 provided in the machine body 2. The boom 15 can be swung up and down by extending and contracting of a boom cylinder C3. The arm 16 can be swung in the arm clouding direction D1 and the arm dumping direction D2 by extending and contracting of an arm cylinder C4. The working tool 17 can be swung in the bucket clouding direction D4 and the bucket dumping direction D3 by extending and contracting of a working tool cylinder (bucket cylinder) C5. The swing cylinder C2, the boom cylinder C3, the arm cylinder C4, and the working tool cylinder C5 are constituted of hydraulic cylinders (hydraulic actuators).

Figure 3:
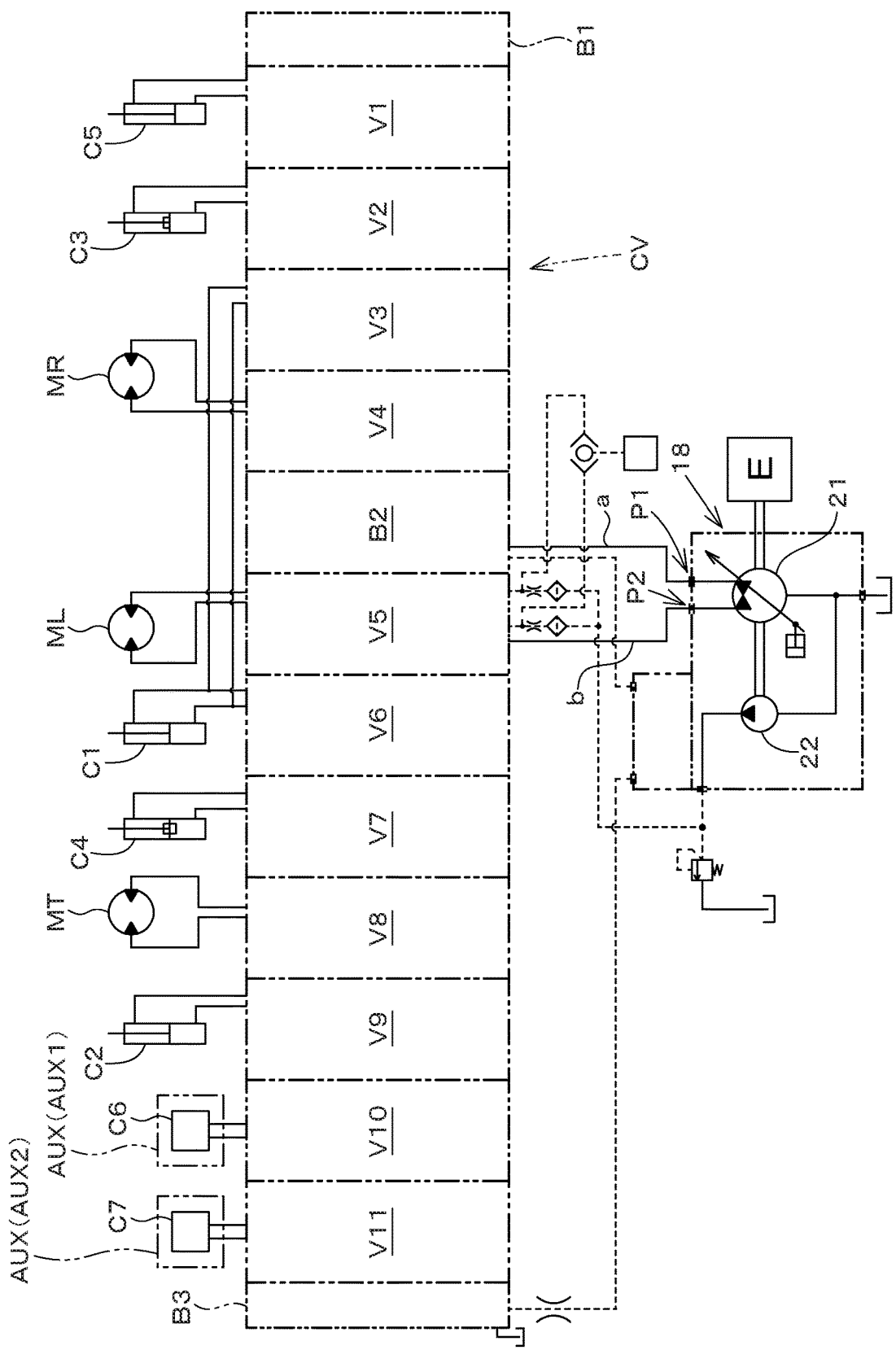
FIG. 3 is a schematic view of a hydraulic system.

As shown in FIG. 3, the control valve CV is configured by integrally arranging, in one direction, control valves V1 to V11 for controlling various types of hydraulic actuators ML, MR, MT, and C1 to C7, an inlet block B2 for taking pressure fluid, and a pair of outlet blocks B1 and B3 for discharging the pressure fluid. In detail, the control valve CV, in the embodiment, is configured by arranging, in turn (arranging from the right in FIG. 3), the first outlet block B1, the working tool control valve V1 for controlling the working tool cylinder C5, the boom control valve V2 for controlling the boom cylinder C3, the first dozer control valve V3 for controlling the dozer cylinder C1, the second traveling control valve V4 for controlling the traveling motor MR of the second traveling device 3R, the inlet block B2, the first traveling control valve V5 for controlling the traveling motor ML of the first traveling device 3L, the second dozer control valve V6 for controlling the dozer cylinder C1, the arm control valve V7 for controlling the arm cylinder C4, the swivel control valve V8 for controlling the swivel motor MT, the swing control valve V9 for controlling the swing cylinder C2, the first SP control valve V10 for controlling the first attachment actuator C6, the second SP control valve V11 for controlling the second attachment actuator C7, and the second outlet block B3, which are connected to each other.

As shown in FIG. 3, the first attachment actuator C6 and the second attachment actuator C7 are hydraulic actuators installed in the hydraulic attachments AUX that is installed instead of or in addition to the bucket 24. The hydraulic attachments AUX include a first hydraulic attachment AUX1 and a second hydraulic attachment AUX2. The first attachment actuator C6 is installed in the first hydraulic attachment AUX1, and the second attachment actuator C7 is installed in the second hydraulic attachment AUX2.

As shown in FIG. 3, hydraulic pumps serving as pressure fluid supply sources for the control valve CV includes a first pump 21 for supplying the hydraulic fluid that operates the hydraulic actuators ML, MR, MT, and C1 to C7, and a second pump 22 for supplying signal pressure fluid (the hydraulic fluid) functioning as a pilot control pressure, a detection signal and the like. The first pump 21 and the second pump 22 are installed in the pressure fluid supply unit 18, and are driven by the prime mover E1.

The first pump 21 has two outlet ports. A first outlet port P1 is connected to the inlet block B2 via a first outlet passage a. A second outlet port P2 is connected to the inlet block B2 via a second outlet passage b. The pressure fluid (hydraulic fluid) supplied to the inlet block B2 is supplied to the respective control valves V1 to V11.

Figure 4:
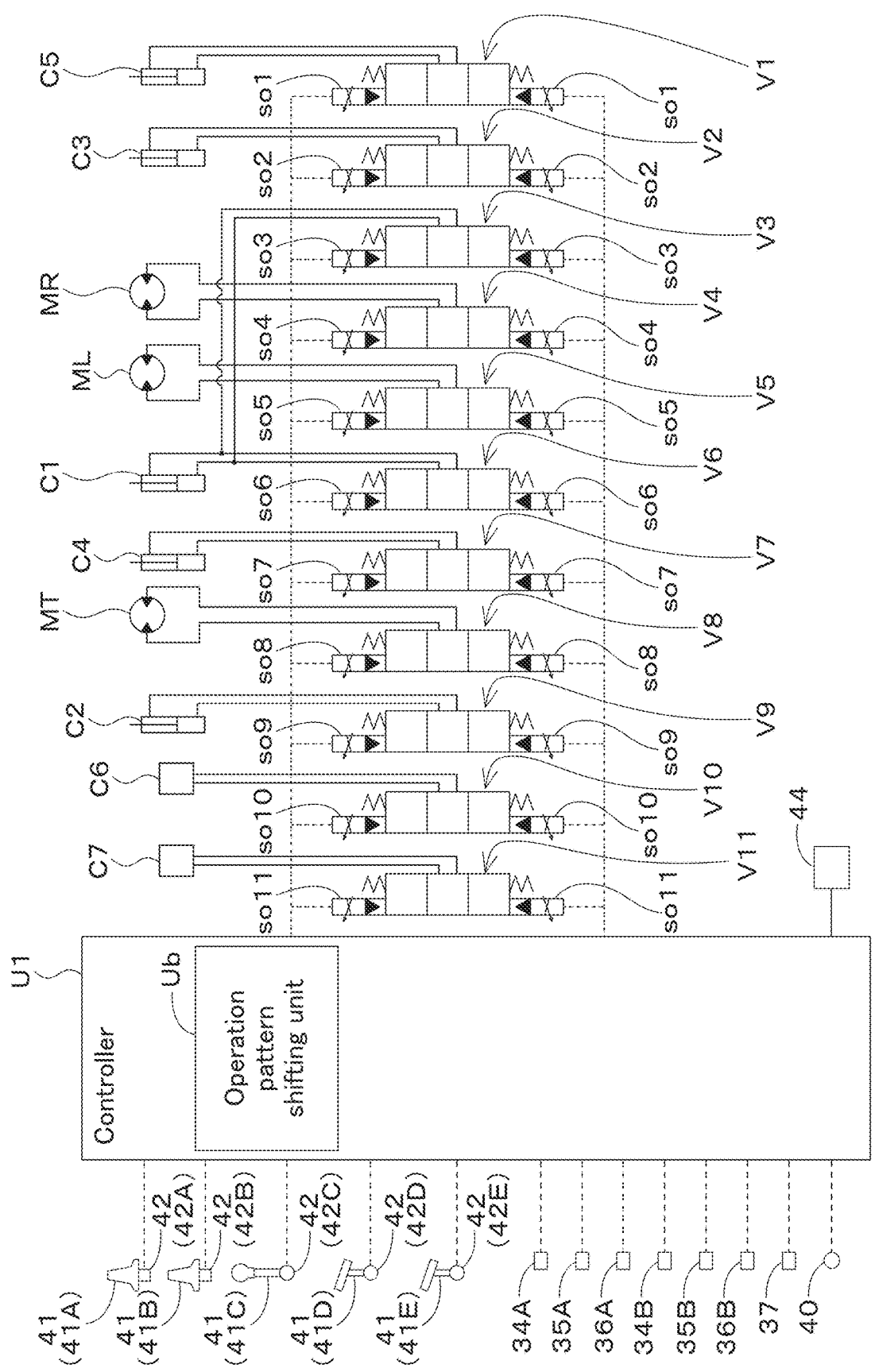
FIG. 4 is a schematic view of a control system.

As shown in FIG. 4, each of the control valves V1 to V11 is constituted of a direct-acting spool-type switching valve. In addition, each of the control valves V1 to V11 is a control valve electrically controlled by the controller U1. In detail, a pilot-operated proportional solenoid valve, for example, serves as each of the control valves V1 to V11. A pilot-operated proportional solenoid valve is a valve configured to move a spool with a pilot control pressure controlled by a proportional solenoid, thereby controlling a flow direction and a flow rate of the hydraulic fluid. In detail, a pilot-operated proportional solenoid valve is a two-stage directional/flow-rate control valve that uses, in a pilot section, a proportional solenoid pressure-reducing valve with two proportional solenoids. The flow rate is controlled by changing an electric current input to the proportional solenoids, and the direction is controlled by applying an electric current to either one of the two proportional solenoids.

As shown in FIG. 4, proportional solenoids so1 to so11 of the respective control valves V1 to V11 are connected to the controller U1. The controller U1 is, for example, constituted of a microcomputer including a CPU (Central Processing Unit) and EEPROM (Electrically Erasable Programmable Read-Only Memory). By the pilot control pressure according to the control signals sent from the controller U1 to the proportional solenoids so1 to so11 (electric current values supplied to the proportional solenoids so1 to so11), the control valves V1 to V11 are pilot-operated so that the directions and flow rates of the hydraulic fluid are controlled with respect to the hydraulic actuators ML, MR, MT, and C1 to C7 which are to be controlled. That is, each of the control valves V1 to V11 is pilot-operated by the pilot control pressure controlled according to a control signal sent from the controller U1. In other words, each of the control valves V1 to V11 is controlled according to electric current values supplied by the controller U1.

As shown in FIG. 4, the controller U1 is connected to operation members 41 (first operation tool 41A to fifth operation tool 41E) for operating the respective control valves V1 to V9. The controller U1 supplies (sends) electric current values (control signals), according to operation amounts of the operation members 41, to the proportional solenoids so1 to so9 of the control valves V1 to V9 which are to be operated.

The first operation tool 41A and the second operation tool 41B are provided in the steering device 1B, and are constituted, for example, of hands that is handled and operated by an operator sitting on the driver's seat 6. The first operation tool 41A includes a sensor 42 (first sensor 42A) for detecting an operational direction and an operation amount of the first operation tool 41A. The first sensor 42A is connected to the controller U1. The second operation tool 41B includes a sensor 42 (second sensor 42B) for detecting an operational direction and an operation amount of the second operation tool 41B. The second sensor 42B is connected to the controller U1.

Figure 5:
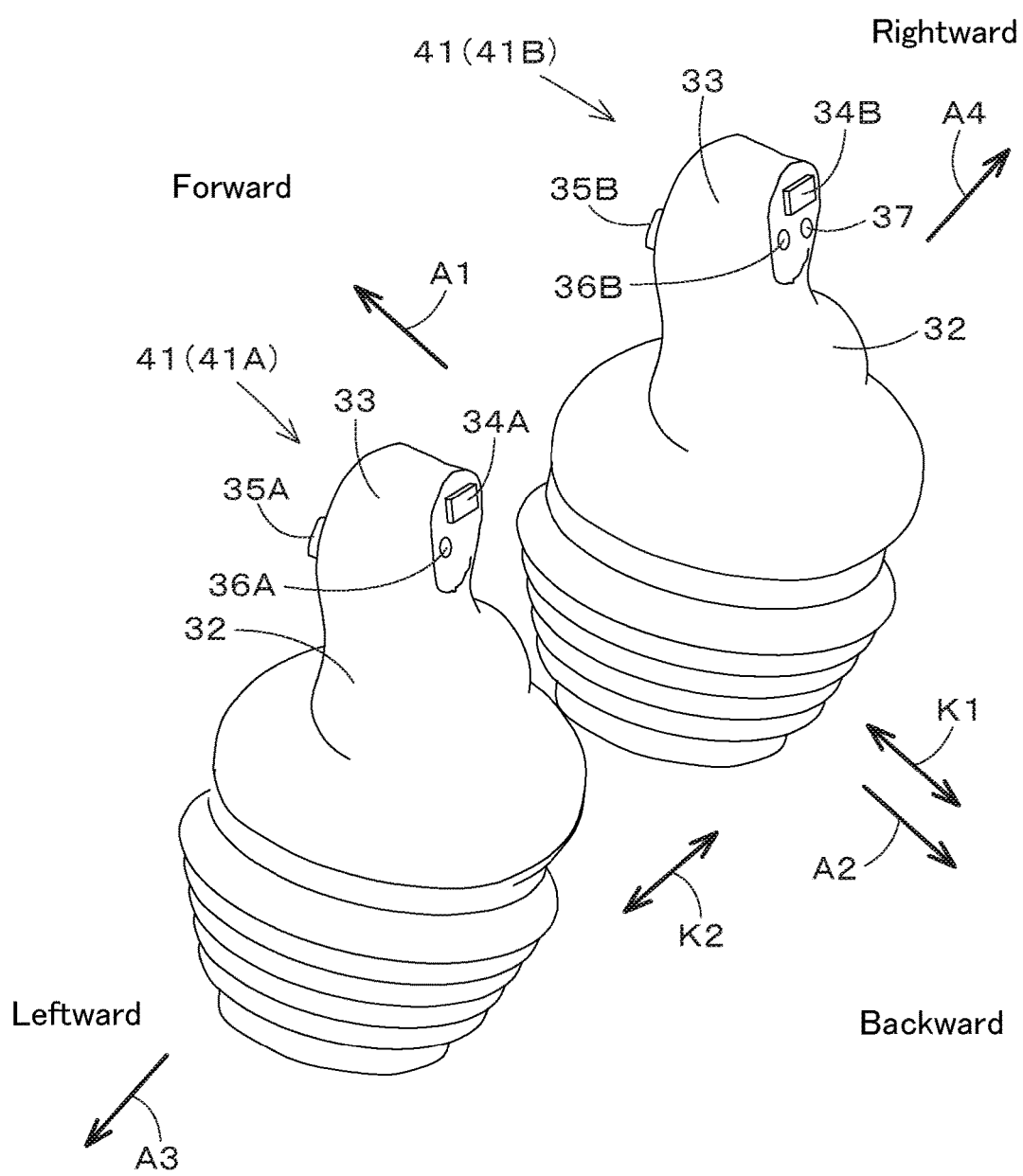
FIG. 5 is a perspective view of an operation member.

As shown in FIG. 5, the first operation tool 41A and the second operation tool 41B are arranged side by side, for example, in the machine width direction K2 (left and right). The first operation tool 41A is an operation member (a left handle) that is handled by an operator with his/her left hand. The second operation tool 41B is an operation member (a right handle) that is handled by the operator with his/her right hand.

As shown in FIG. 5, each of the first operation tool 41A and the second operation tool 41 includes, in the middle portion thereof in the vertical direction, a gripping portion 32 to be handled (with his palm) by an operator, and a lever portion 33 projecting upward from the gripping portion 32. The first operation tool 41A includes a first switch 34A, a second switch 35A, and a third switch 36A which are disposed on the lever portion 33 thereof. The second operation tool 41B includes a first switch 34B, a second switch 35B, a third switch 35B, and a fourth switch 37 which are disposed on the lever portion 33 thereof.

The first switch 34A and the first switch 34B are each disposed on an upper back surface of the lever portion 33, and are each constituted, for example, of a slide switch to be operated slidably left and right. Each of the first switch 34A and the first switch 34B can be operated with a thumb. Each of the first switch 34A and the first switch 34B may be a switch to be operated swingably left and right, for example, may be a seesaw switch.

The second switch 35A and the second switch 35B are each disposed on a front portion of the lever portion 33. Each of the second switch 35A and the second switch 35B may be a switch to be pressed by an index finger, a middle finger, or the like, e.g., a trigger switch.

Each of the third switch 36A and the third switch 36B is disposed below each of the first switches 34A and 34B disposed on the back surface of the lever portion 33, and is constituted, for example, of a push-button switch (SW1).

The fourth switch 37 is disposed below the first switch 34B disposed on the back surface of the lever portion 33 of the second operation tool 41B, and is constituted, for example, of a push-button switch (SW2).

As shown in FIG. 4, the first switches 34A and 34B, the second switches 35A and 35B, the third switches 36A and 36B, and the fourth switch 37 are connected to the controller U1. The controller U1 is configured to obtain command signals sent from the first switches 34A and 34B, the second switches 35A and 35B, the third switches 36A and 36B, and the fourth switch 37.

The first SP control valve V10 can be operated (the first attachment actuator C6 can be operated) by one of the first switch 34A and the first switch 34B, and the second SP control valve V11 can be operated (the second attachment actuator C7 can be operated) by the other switch. In addition, the swing control valve V9 (swing bracket 14) can be selectively operated by the first switch 34A.

That is, the first switch 34A and the first switch 34B are operation members for operating the first SP control valve V10, the second SP control valve V11, and the swing control valve V9.

As shown in FIG. 5, the first and second operation tools 41A and 41B are each operable to be tilted forward and backward (back and forth), and to be tilted leftward and rightward (left and right). By tilting each of the first operation tool 41A and the second operation tool 41B back and forth and left and right, two operation targets provided in the swivel working machine 1 can be operated. Specifically, the first operation tool 41A and the second operation tool 41B are operable to operate the working tool control valve V1, the boom control valve V2, the arm control valve V7, the swivel control valve V8, and the swing control valve V9. As for the swivel control valve V8 and the swing control valve V9, either one of them can be operated selectively.

Based on the detection signals from the first sensor 42A and the second sensor 42B, the controller U1 controls the working tool control valve V1 (swing movement in which the working tool 17 swings), the boom control valve V2 (swing movement in which the boom 15 swings), the arm control valve V7 (swing movement in which the arm 16 swings), the swivel control valve V8 (swivel movement in which the machine body 2 swivels), and the swing control valve V9 (swing movement in which the working device 4 swings).

The third operation tool 41C is provided on the steering device 1B, and is, for example, a lever. The third operation tool 41C is operable to operate the first dozer control valve V3 and the second dozer control valve V6 (for the dozer cylinder C1), (operate the dozer 7). In addition, the third operation tool 41C has a sensor 42 (a third sensor 42C) for detecting an operational direction and an operation amount of the third operation tool 41C. The third sensor 42C is connected to the controller U1. Based on the detection signal from the third sensor 42C, the controller U1 controls the first dozer control valve V3 and the second dozer control valve V6 (for the dozer 7).

The fourth operation tool 41D and the fifth operation tool 41E are provided, for example, on a floor portion in front of the driver's seat 6, and are constituted of a pedal to be operated by a foot of an operator.

The fourth operation tool 41D is operable to operate the first traveling control valve V5 (for the first traveling motor ML), (to operate the first traveling device 3L). In addition, the fourth operation tool 41D has the sensor 42 (a fourth sensor 42D) for detecting an operational direction and an operation amount of the fourth operation tool 41D. The fourth sensor 42D is connected to the controller U1. The controller U1 controls the first traveling control valve V5 (for the first traveling device 3L) based on the detection signal from the fourth sensor 42D.

The fifth operation tool 41E is operable to operate the second traveling control valve V4 (for the second traveling motor MR), (to operate the second traveling motor 3R). In addition, the fifth operation tool 41E has the sensor 42 (a fifth sensor 42E) for detecting an operational direction and an operation amount of the fifth operation tool 41E. The fifth sensor 42E is connected to the controller U1. The controller U1 controls the second traveling control valve V4 (for the second traveling device 3R) based on the detection signal from the fifth sensor 42E.

The configurations of the sensors 42 (the first sensor 42A to fifth sensor 42E) are not particularly limited. For example, potentiometers can be adopted as the sensors 42.

Spools of the respective control valves V1 to V11 are moved in proportion to the operation amounts of the respective control members 41, 34A, and 34B of the respective control valves V1 to V11, and supply hydraulic fluid to the hydraulic actuators ML, MR, MT, C1 to C7 in proportion to movement degrees of the respective control valves V1 to V11. That is, a movement speed of each operation target (control target) can be changed in proportion to each of operation amounts of the respective operation members 41, 34A, and 34B.

As described above, the control valves V1 to V11 are each operated by operation of each of the operation members 41, 34A, and 34B, thereby controlling the corresponding one of the hydraulic actuators ML, MR, MT, and C1 to C7. Then, each of the hydraulic actuators ML, MR, MT, and C1 to C6 drives the corresponding driver (the machine body 2, the traveling device 3, the dozer device 7, the boom 15, the arm 16, the working tool 17, the first hydraulic attachment AUX1, or the second hydraulic attachment AUX2).

Next, referring to FIG. 6, an example of operation patterns in each of which the first operation tool 41A and the second operation tool 41B are tilted back and forth, left and right, will be explained.

Figure 6:
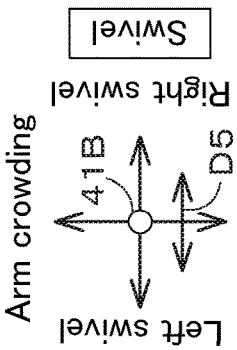
FIG. 6 is a view showing an example of an operation pattern of the operation member.

As shown in FIG. 6, there are a plurality of operation patterns about tilting of the first and second operation tools 41A and 41B. In the embodiment, as shown in FIG. 6, four operation patterns (first to fourth operation patterns) are provided as the plurality of operation patterns from which one can be selected as a present operation pattern of the first and second operation tools 41A and 41B.

As shown in FIG. 6, in the first operation pattern, the arm 16 is swung by back-and-forth tilting of the first operation tool 41A, and the machine body 2 is swiveled by left-and-right tilting of the first operation tool 41A. Meanwhile, the boom 15 is swung by back-and-forth tilting of the second operation tool 41B, and the bucket 17 is swung by left-and-right tilting of the second operation tool 41B.

In the second operation pattern, the boom 15 is swung by the back-and-forth tilting of the first operation tool 41A, and the bucket 17 is swung by the left-and-right tilting of the first operation tool 41A. Meanwhile, the arm 16 is swung by the back-and-forth tilting of the second operation tool 41B, and the machine body 2 is swiveled the left and right tilting operations of the second operation tool 41B.

In the third operation pattern, the arm 16 is swung by the back-and-forth tilting of the first operation tool 41A, and the working device 4 (swing bracket 14) is swung by the left-and-right tilting of the first operation tool 41A. Meanwhile, the boom 15 is swung by the back-and-forth tilting of the second operation tool 41B, and the bucket 17 is swung by the left-and-right tilting of the second operation tool 41B.

In the fourth operation pattern, the boom 15 is swung by the back-and-forth tilting of the first operation tool 41A, and the bucket 17 is swung by the left-and-right tilting of the first operation tool 41A. Meanwhile, the arm 16 is swung by the back-and-forth tilting of the second operation tool 41B, and the working device 4 (swing bracket 14) is swung by the left-and-right tilting of the second operation tool 41B.

As shown in FIG. 4, the controller U1 includes an operation pattern shifting unit Ub. In addition, a pattern shifting member (4P_SW) 40, which instructs the shifting of the operation pattern, is connected to the controller U1. The controller U1 is configured to obtain, from the pattern shifting member 40, a shifting signal to shift the operation pattern. When the controller U1 obtains the shifting signal sent from the pattern shifting member 40, the operation pattern shifting unit Ub determines, as the selected operation pattern, one of the first operation pattern to the fourth operation pattern.

Figure 7:
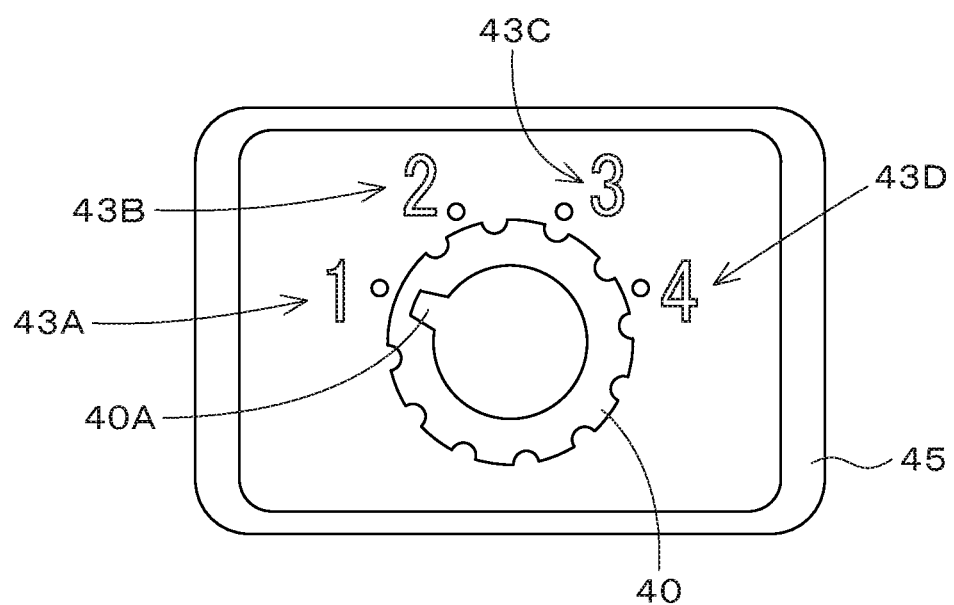
FIG. 7 is a view showing a pattern shifting member.

As shown in FIG. 7, the pattern shifting member 40 is a manually operable switch that is handled and operated by an operator. Specifically, the pattern shifting member 40 is a rotary switch (a switch), and is pivotally attached to the base plate 45. In addition, the pattern shifting member 40 includes an indicator 40A. On the base plate 45, first to fourth marks 43A to 43D are arranged peripherally around the pattern shifting member 40. The operation pattern can be shifted by rotating the pattern shifting member 40 to align the indicator 40A with any of the first mark 43A to fourth mark 43D. For example, when the indicator 40A is aligned with the first mark 43A, the operation pattern shifting unit Ub shifts the operation pattern to the first operation pattern. When the indicator 40A is aligned with the second mark 43B, the operation pattern shifting unit Ub shifts the operation pattern to the second operation pattern. When the indicator 40A is aligned with the third mark 43C, the operation pattern shifting unit Ub shifts the operation pattern to the third operation pattern. When the indicator 40A is aligned with the fourth mark 43D, the operation pattern shifting unit Ub shifts the operation pattern to the fourth operation pattern.

The pattern shifting member 40 may be a meter (a monitor) connected to the controller U1, and the operating pattern may be shifted on a screen of the meter.

In FIG. 6, comparing the first operation pattern to the third operation pattern, the swivel movement, which is a swiveling movement of the machine body 2, is performed in the first operation pattern by operating the first operation tool 41A in the machine width direction K2 (in a specific direction D5). In the third operation pattern, the swing movement, which is a swinging movement of the working device 4, is performed by operating the first operation tool 41A in the machine width direction K2 (in the specific direction D5).

That is, the pattern shifting member 40 (the operation pattern shifting unit Ub) is operated to select either a swivel operation state in which the operation of the first operation tool 41A (the operation member 41) in the specific direction D5 causes the swivel movement or a swing operation state in which the operation of the first operation tool 41A (the operation member 41) in the specific direction D5 causes the swing movement.

In addition, comparing the second operation pattern to the fourth operation pattern, the swivel movement is performed in the second operation pattern by operating the second operation tool 41B in the machine width direction K2 (in the specific direction D5). In the fourth operation pattern, the swing movement is performed by operating the second operation tool 41B in the machine width direction K2 (in the specific direction D5).

That is, the pattern shifting member 40 (the operation pattern shifting unit Ub) is operated to select either the swivel operation state in which the operation of the second operation tool 41B (the operation member 41) in the specific direction D5 causes the swivel movement or the swing operation state in which the operation of the second operation tool 41B (the operation member 41) in the specific direction D5 causes the swing movement.

As described above, in the embodiment, the operation pattern can be shifted between the swivel operation state in which the machine body 2 is operated as performance of the swivel movement and the swing operation state in which the working device is operated as performance of the swing movement.

There is a working machine called a TLB, in which a front loader is attached to the front portion of the tractor and a backhoe is attached to the rear portion of the tractor. In the TLB, the working device on the backhoe can generally be operated in the swing movement by an operation member handled and operated by an operator. In a case when the operator who is accustomed to riding this TLB uses the swivel working machine 1, the working device 4 can be swung through operation of the operation member handled and operated by the operator when the operation pattern is shifted to the third operation pattern or the fourth operation pattern.

In addition, since the pattern shifting member 40 is constituted of a manual switch such as a rotary switch, it can be easily determined which one is selected, the swivel movement in which the machine body 2 is swiveled through a swing operation of the operation member 41 to be handled and operated by the operator or the swing movement in which the working device 4 is swung through the swing operation of the operation member 41 to be handled and operated by the operator. In addition, it is possible to instantly confirm whether the movement is in the swivel operation state or the swing operation state.

Figure 8:
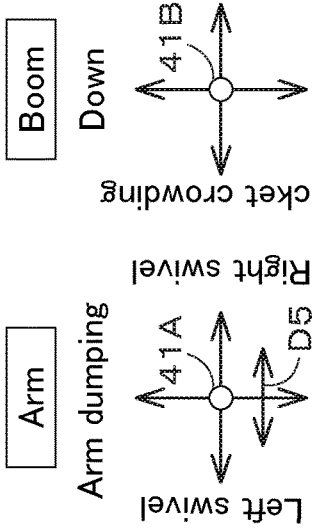
FIG. 8 is a view showing another example of the operation pattern of the operation member.

The specific direction D5 that is an operational direction for selectively causing either the swivel movement or the swing movement does not have to be the machine width direction K2. It may be the fore-and-aft direction K1. For example, as shown in FIG. 8, in the second operation pattern, the machine body 2 may be swiveled by back-and-forth tilting of the first operation tool 41A, and the arm 16 may be swung by left-and-right tilting of the first operation tool 41A. In the fourth operation pattern, the working device 4 may be swung by back-and-forth tilting of the first operation tool 41A, and the arm 16 may be swung by left-and-right tilting operations of the first operation tool 41A. Alternatively, another operation pattern may be adopted.

As shown in a table in FIG. 9, the swivel working machine 1 according to the embodiment can selectively have a first configuration, a second configuration, or a third configuration.

In the first configuration, the first hydraulic attachment AUX1 is operated by operating the first switch 34B (the slide switch) on the second operation tool 41B (the right handle), and the second hydraulic attachment AUX2 is operated by operating the first switch 34A (the slide switch) on the first operation tool 41A (the left handle). In addition, in the first configuration, the third switch 36B (SW1) on the second operation tool 41B (the right handle) can be pressed to sound a horn, and the third switch 36A (SW1) on the first operation tool 41A (the left handle) can be pressed to release the dumping movement (to cancel restriction of the movement of the arm 16 in the arm dumping direction D2). In addition, the fourth switch 37 (SW2) on the second operation tool 41B (the right handle) can be pressed to allow the hydraulic attachment AUX to be activated. In addition, the second switch 35B (the trigger switch) on the second operation tool 41B (the right handle) can be operated to lock the operation of the hydraulic attachment AUX. Furthermore, in the first configuration, the swinging movement of the working device 4 is performed by operating a pedal additionally provided on the floor portion in front of the driver's seat 6. In addition, in the first configuration, it is impossible to shift between the swivel movement of the machine body 2 and the swing movement of the working device 4, the pattern shifting member (4P_SW) 40 is not provided, and only one operation pattern (for example, the first operation pattern) is employed.

In the second configuration, the first hydraulic attachment AUX1 is operated by operating the first switch 34B (the slide switch) on the second operation tool 41B (the right handle), and either the second hydraulic attachment AUX2 or the swing cylinder C2 is selectively operated by operating the first switch 34A (the slide switch) on the first operation tool 41A (the left handle). In addition, in the second configuration, the third switch 36B (SW1) on the second operation tool 41B (the right handle) can be pressed to sound a horn, and the third switch 36A (SW1) on the first operation tool 41A (the left handle) can be pressed to release the dumping movement. In addition, the fourth switch 37 (SW2) on the second operation tool 41B (the right handle) can be pressed to allow the hydraulic attachment AUX to be activated. In addition, the second switch 35B (the trigger switch) on the second operation tool 41B (the right handle) can be operated to lock the operation of the hydraulic attachment AUX, and the second switch 35A (the trigger switch) on the first operation tool 41A (the left handle) can be operated to shift an operation mode between an attachment operation mode and a swing operation mode. The attachment operation mode is a mode to allow the second hydraulic attachment AUX2 (hydraulic attachment AUX) to be operated by operating the first switch 34A (the slide switch) on the first operation tool 41A (the left handle). The swing operation mode is a mode to allow the working device 4 to be swung by operating the first switch 34 (the slide switch) on the first operation tool 41A (the left handle). Furthermore, in the second configuration, the swinging movement of the working device 4 is performed by operating the first switch 34 (the slide switch) on the operation tool 41A (the left handle) with an operator's hand, and a pedal for the swing operation of the working device 4 is not provided. In addition, the pattern shifting member (4P_SW) 40 is not provided, and only one operation pattern (for example, the first operation pattern) is employed.

In the third configuration, the second hydraulic attachment AUX2 is operated by operating the first switch 34B (the slide switch) on the second operation tool 41B (the right handle), and either the first hydraulic attachment AUX1 or the swing cylinder C2 is selectively operated by operating the first switch 34A (the slide switch) on the first operation tool 41A (the left handle). In the third configuration, for example, a thumb (attachment) serves as the second hydraulic attachment AUX2 to be operated by the first switch 34B (the slide switch) on the second operation tool 41B (the right handle). The thumb is a hydraulic attachment that is attached to the tip portion of the arm 16 together with the bucket 17 and works together with the bucket 17 to clamp an object to be clamped, such as wood. In the third configuration, the third switch 36B (SW1) on the second operation tool 41B (the right handle) can be pressed to sound a horn, and the third switch 36A (SW1) on the first operation tool 41A (the left handle) can be pressed to release the dumping movement. In addition, the fourth switch 37 (SW2) on the second operation tool 41B (the right handle) can be pressed to allow the hydraulic attachment AUX to be activated. In addition, the second switch 35B (the trigger switch) on the second operation tool 41B (the right handle) can be operated to lock the operation of the hydraulic attachment AUX. The second switch 35A (the trigger switch) of the first operation tool 41A (the left handle) can be operated to shift the operation mode between the attachment operation mode and either the swing operation mode or the swivel operation mode. The swivel operation mode is a mode in which the first switch 34A (the slide switch) on the first operation tool 41A (the left handle) is used to swivel the machine body 2.

In this third configuration, in the attachment operation mode, the first hydraulic attachment AUX1 (hydraulic attachment AUX) is operated by operating the first switch 34A (the slide switch) on the first operation tool 41A (the left handle). Furthermore, in the third configuration, a pedal for the swing operation of the working device 4 is not provided. In addition, in the third configuration, the pattern shifting member (4P_SW) 40 is provided. That is, in the third configuration, the operation pattern of the first operation tool 41A (the left handle) and the second operation tool 41B (the right handle) can be selected from the plurality of operation patterns (four patterns in the embodiment).

In the third configuration, when the operation pattern shifting unit Ub shifts the operation state to the swivel operation state (the first operation pattern or the second operation pattern), the second switch 35 can be used to shift the operation mode between the attachment operation mode and the swing operation mode. In addition, when the operation pattern shifting unit Ub shifts the operation state to the swing operation state (the third operation pattern or the fourth operation pattern), the second switch 35 can be used to shift the operation mode between the attachment operation mode and the swivel operation mode.

In addition, in the third configuration, when the operation pattern shifting unit Ub shifts the operation state to the swivel operation state, and when the second switch 35A (the trigger switch) on the first operation tool 41A (the left handle) is operated to shift the operation mode to the swing operation mode, it is possible to simultaneously perform the swing operation and the swivel operation by operating (handling) the operation member 41 handled by an operator.

In the second configuration, when the second switch 35A (the trigger switch) on the first operation tool 41A (the left handle) is operated to shift the operation mode to the swing operation mode, it is possible to simultaneously perform the swing operation and the swivel operation by operating (handling) the operation member 41 handled by an operator.

The swivel working machine 1 according to the embodiment can have one selected from two configurations: one configuration (the second configuration) in which it is impossible to shift the operation pattern from the swing operation state and further it is possible to shift the operation mode between the attachment operation mode and the swing operation mode, and another configuration (the third configuration) in which it is possible to shift the operation state between the swivel operation state and the swing operation state and further it is possible to shift the operation mode between the attachment operation mode and the swing operation mode.

In the embodiment, an operation method to cause the swinging movement of the working device 4 (the swing bracket 14) corresponds to one selected from three operation patterns: the pedal operation in the first configuration, the volume operation using the slide switch in the second configuration, and of the tilting of the operation member 41 in the third configuration.

As shown in FIG. 4, the swivel working machine 1 includes an information unit 44 that informs an operator that the swivel working machine 1 is in the swing operation mode. The informing unit 44 is connected to the controller U1. The information unit 44 is located in the vicinity of the operator's seat 6, and is constituted of a meter (monitor), an indicator, or the like.

In the above-described embodiment, each of the control valves V1 to V11 is constituted of a pilot-type proportional solenoid valve, and the controller U1 controls an electric current value supplied to each of the control valves V1 to V11 to control each of the control valves V1 to V11. However, a configuration of the swivel working machine 1 is not limited to this configuration.

Figure 10:
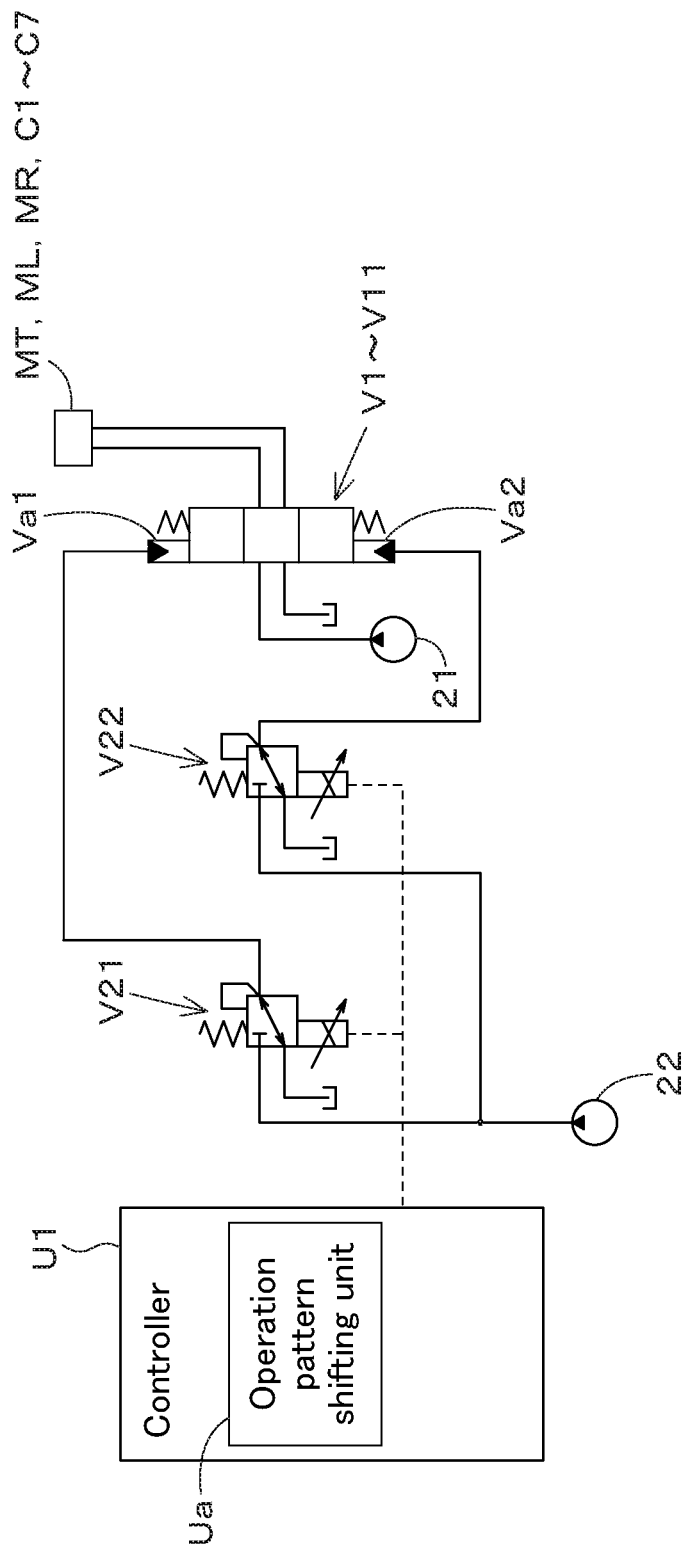
FIG. 10 is a configuration view showing a control valve and the like according to an alternative embodiment.

For example, as shown in FIG. 10, each of the control valves V1 to V11 is constituted of a pilot-operated switching valve that is pilot-operated by pilot control pressures acting on a pair of pilot-pressure receiving portions Va1 and Va2, and a pair of proportional solenoid valves V21 and V22 to be controlled by the controller U1 are provided, so that a pilot control pressure is supplied from the proportional solenoid valve V21 on one side to the pilot pressure receiving portion Va1 on one side, and a pilot control pressure is supplied from the proportional solenoid valve V22 on the other side to the pilot pressure receiving portion Va2 on the other side. In this configuration, a flow direction and a flow rate of the hydraulic fluid to the hydraulic actuators MT, ML, MR, C1 to C7 may be controlled.

Figure 11:
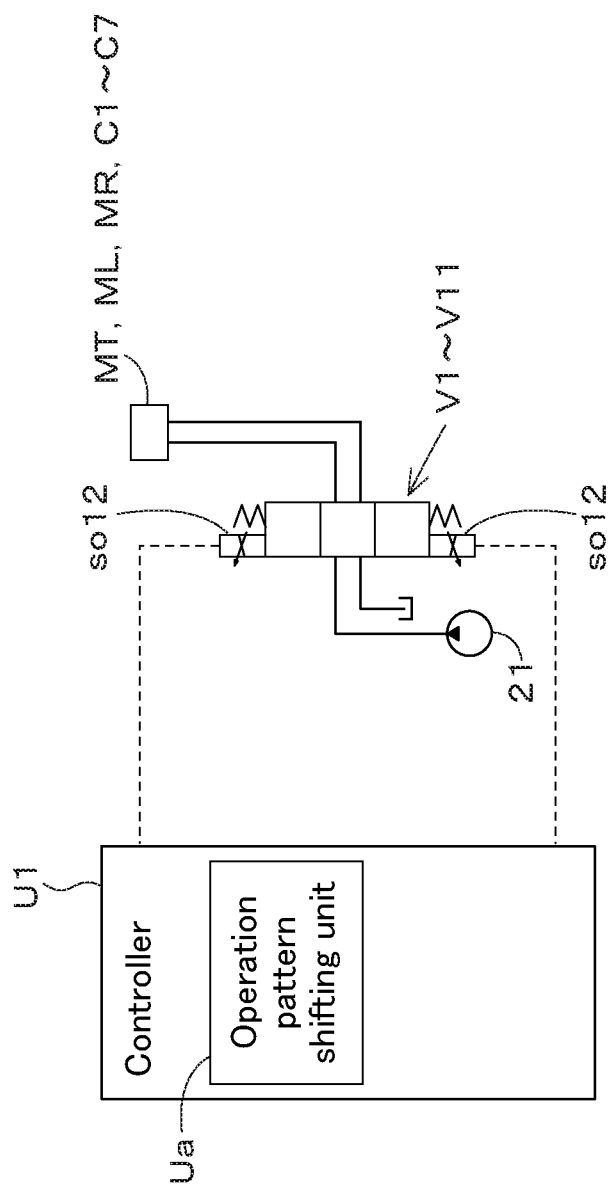
FIG. 11 is a configuration view showing a control valve and the like according to another alternative embodiment.

In addition, as shown in FIG. 11, each of the control valves V1 to V11 may be constituted of a proportional-solenoid-type directional and flow control valve in which a spool is directly driven by a proportional solenoid so12 to which an electric current is supplied from the control unit U.

The swivel working machine 1 includes the machine body 2 swivelable around the swivel axis X1, the working device 4 attached to the machine body 2 swingably around the swing axis X2, the operation member 41 to be handled and operated by an operator, and the controller U1 to control the swivel movement, which is a swiveling movement of the machine body 2, and the swing movement, which is a swinging movement of the working device 4. The controller U1 includes the operation pattern shifting unit Ub configured or programmed to perform shifting between the swivel operation state where operation of the operation member 41 in a specific direction D5 causes the swivel movement and the swing operation state where the operation of the operation member 41 in the specific direction D5 causes the swing movement.

According to this configuration, an operation state is shifted between the swivel operation state in which the swivel movement is performed by operating, in the specific direction D5, the operation member 41 to be handled and operated by an operator and the swivel operation state in which the swing movement is performed by operating the operation member 41 in the specific direction D5. This allows the working device 4 to be swung by operating the operation member 41 to be handled and operated by the operator.

Also, the swivel working machine 1 includes the pattern shifting member 40 operated to shift the operation pattern of the operation member 41. The controller U1 obtains a shifting signal for shifting the operation pattern transmitted from the pattern shifting member 40, the operation pattern shifting unit Ub shifts the operation pattern between the swivel operation state and the swing operation state.

According to this configuration, the operator can switch the operation state between the swivel operation state and the swing operation state.

Also, a manually operable switch to be handled and operated by the operator serves as the pattern shifting member 40.

According to this configuration, the operation pattern of the operation member 41 can be easily shifted, and it can be easily confirmed which operation state is selected as the operation pattern.

Also, the swivel working machine includes the hydraulic attachment AUX attached to the working device 4, the first switch 34A to operate the hydraulic attachment AUX, and the second switch 35A to select either the attachment operation mode where operation of the first switch 34 causes operation of the hydraulic attachment AUX or the swing operation mode where operation of the first switch 34 causes the swing movement.

According to this configuration, while the swivel operation state is selected as the operation pattern, the swing movement can be performed by operating the first switch 34A.

Also, when the operation pattern shifting unit Ub selects the swivel operation state, the second switch 35A enables the first switch 34A to be operated selectively in either the attachment operation mode or the swing operation mode, and when the operation pattern shifting unit Ub selects the swing operation state, the second switch 35A enables the first switch 34A to be operated selectively in either the attachment operation mode or the swivel operation mode where operation of the first switch 34 causes the swivel movement.

According to this configuration, it is possible to prevent duplication of the swing or swivel operation by the operation member 41 and the swing or swivel operation by the first switch 34A.

Also, the swivel working machine includes the information unit 44 to inform that the swing operation mode is selected.

According to this configuration, the operator can be informed that the machine is in the swing operation mode.

Also, the swivel working machine 1 is capable of having a configuration (the second configuration) in which shifting from the swing operation state is not allowed and the shifting between the attachment operation mode and the swing operation mode is allowed, and the swivel working machine 1 is capable of having another configuration (the third configuration) in which the shifting between the swivel operation state and the swing operation state is allowed and the shifting between the attachment operation mode and either the swing operation mode or the swivel operation mode is allowed.

According to this configuration, the swivel working machine 1 can have either one of the prepared configurations in correspondence to a region where the swivel working machine 1 is used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A swivel working machine comprising:
a traveling device;
a machine body supported on the traveling device such that the machine body is swivelable relative to the traveling device around a swivel axis which is an axis extending in a vertical direction;
a working device attached to the machine body via a swing bracket swingably together with the swing bracket relative to the machine body around a swing axis which is an axis extending in the vertical direction;
an operation member to be handled and operated by an operator; and
a controller to control a vertical axial swivel movement of the machine body, which is a swiveling movement of the machine body relative to the traveling device around the swivel axis, a vertical axial swing movement of the working device, which is a swinging movement of the working device relative to the machine body around the swing axis, and a horizontal axial swing movement of the working device, which is a swinging movement of one component of the working device relative to another component of the working device or the swing bracket,
wherein the working device includes:
a boom pivotally connected to the swing bracket swingably relative to the swing bracket and supported by the machine body via the swing bracket;
an arm pivotally connected to the boom swingably relative to the boom; and
a working tool pivotally connected to the arm swingably relative to the arm,
the vertical axial swing movement of the working device includes a vertical axial swinging movement of the swing bracket relative to the machine body around the swing axis,
the horizontal axial swing movement of the working device includes a horizontal axial swinging movement of the boom relative to the swing bracket, a horizontal axial swinging movement of the arm relative to the boom and/or a horizontal axial swinging movement of the working tool relative to the arm,
the operation member is operable to be tilted along a fore-and-aft direction and a machine width direction and is configured such that operation of the operation member along a first direction which is one of the fore-and-aft direction and the machine width direction selectively causes the machine body to perform the vertical axial swivel movement of the working device, and the working device to perform the swinging movement and operation of the operation member along a second direction which is the other of the fore-and aft direction and the machine width direction and which differs from the first direction causes one of the boom, the arm, and the working tool of the working device to perform the horizontal axial swing movement of the working device, and
the controller includes an operation pattern shifting unit configured or programmed to perform shifting between a swivel operation state where operation of the operation member along the first direction causes the machine body to perform the vertical axial swivel movement of the machine body and a swing operation state where the operation of the operation member along the first direction causes the swing bracket to perform the vertical axial swing movement of the working device.

2. The swivel working machine according to claim 1, further comprising:
   a pattern shifting member operated to shift an operation pattern of the operation member, wherein
   when the controller obtains a shifting signal for shifting the operation pattern transmitted from the pattern shifting member, the operation pattern shifting unit shifts the operation pattern between the swivel operation state and the swing operation state.

3. The swivel working machine according to claim 2, wherein
   a manually operable switch to be handled and operated by the operator serves as the pattern shifting member.

4. The swivel working machine according to claim 1, further comprising:
   a hydraulic attachment attached to the working device;
   a first switch to operate the hydraulic attachment; and
   a second switch to select either an attachment operation mode where operation of the first switch causes operation of the hydraulic attachment or a swing operation mode where operation of the first switch causes the swing movement of the working device.

5. The swivel working machine according to claim 4, wherein when the operation pattern shifting unit selects the swivel operation state, the second switch is used to select either the attachment operation mode where operation of the first switch causes operation of the hydraulic attachment or the swing operation mode where operation of the first switch causes the vertical axial swing movement of the working device, and
   when the operation pattern shifting unit selects the swing operation state, the second switch is used to select either the attachment operation mode where operation of the first switch causes operation of the hydraulic attachment or a swivel operation mode where operation of the first switch causes vertical axial the swivel movement of the machine body.

6. The swivel working machine according to claim 4, further comprising:
   an information unit to inform that the swing operation mode is selected.

7. The swivel working machine according to claim 4, wherein the swivel working machine has a configuration in which shifting between the swivel operation state and the swing operation state is allowed and shifting between the attachment operation mode and either the swing operation mode or a swivel operation mode where operation of the first switch causes the vertical axial swivel movement of the machine body is allowed, and the swivel working machine is modifiable to have another configuration in which shifting from the swing operation state is not allowed and the shifting between the attachment operation mode and the swinging operation is allowed.

\* \* \* \* \*